US007389279B2

(12) United States Patent
Ruml et al.

(10) Patent No.: US 7,389,279 B2
(45) Date of Patent: Jun. 17, 2008

(54) SYSTEM AND METHOD FOR TIME-AWARE PATH FINDING (75) Inventors: Wheeler Ruml, Palo Alto, CA (US); Elisabeth H. Crawford, Pttsburgh, PA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 87 days.

(21) Appl. No.: 11/166,942

(22) Filed: Jun. 24, 2005

(65) Prior Publication Data

US 2007/0011123 A1 Jan. 11, 2007

(51) Int. Cl.
*G06F 17/00* (2006.01)
(52) U.S. Cl. .............................. 706/45; 706/46; 706/47
(58) Field of Classification Search .................. 706/19, 706/45–44, 55, 61
See application file for complete search history.

(56) References Cited

U.S. PATENT DOCUMENTS

| 6,651,046 B1 | 11/2003 | Sato et al. |
| 6,687,606 B1 | 2/2004 | Moitra et al. |
| 2001/0013027 A1 | 8/2001 | Akkiraju et al. |
| 2003/0167265 A1 | 9/2003 | Corynen |

OTHER PUBLICATIONS

Yang et al., "Evaluation of a Parallel Branch-and-Bound Algorithm on a Class of Multiprocessors", IEEE Transactions on Parallel and Distributed Systems, 1994, pp. 74-86.* http//therory.stanford.edul~amitp/GameProgramming/AStarComparison.html, pp. 1-24.*

Dechter, Rina and Pearl, Judea "The Optimality of A*" Search in Artificial Intelligence, Springer-Verlag, 1988, pp. 166-199.

Hart, Peter E. et al. "A Formal Basis for the Heuristic Deterministic of Minimum Cost Paths" IEEE Transactions on Systems Science and Cybernetics, vol. SSC-4, No. 2, Jul. 1968, pp. 100-107.

Zhou, Rong and Hansen, Eric A. "Multiple Sequence Alignment Using Anytime A*" Proceedings Eighteenth National Conference on Artificial Intelligence (AAA1-02), AAAI Press/The MIT Press, 2002, pp. 975-976.

* cited by examiner

*Primary Examiner*—Joseph P. Hirl
*Assistant Examiner*—Omar F Fernandez
(74) *Attorney, Agent, or Firm*—Fay Sharpe LLP (57) ABSTRACT

A method for obtaining solutions to combinatorial problems by way of a discrete state-based search approach utilizes a node evaluation function based both on solution quality and distance in search steps to a goal. The method considers the problem as finding the shortest path between an initial state and a goal state in a large graph and performs solution evaluation utilizing computation time balanced against solution quality. Rather than solely using a lower bound on the solution cost achievable below a search node, an estimate of the distance (in search steps) to the nearest solution below a search node is also utilized. These are combined using the user's stated utility function (represented as a function of time and cost) to evaluate candidate search nodes.

15 Claims, 5 Drawing Sheets

SYSTEM AND METHOD FOR TIME-AWARE PATH FINDING

INCORPORATION BY REFERENCE

The following U.S. patents and published U.S. patent applications are fully incorporated herein by reference: U.S. Pat. No. 6,687,606 ("Architecture for Automatic Evaluation of Team Reconnaissance and Surveillance Plans"); U.S. Pat. No. 6,651,046 ("Optimizing Apparatus, Optimizing Method, and Storage Medium"); U.S. Pat. App. No. 20030167265 ("Computer Method and User Interface for Decision Analysis and for Global System Optimization"); and U.S. Pat. App. No. 20010013027 ("Optimization Prediction for Industrial Processes").

BACKGROUND

This disclosure relates generally to problem solution approaches and more particularly to solution evaluation utilizing computation time balanced against solution quality.

Many tasks, such as paper path planning, parsing, or biological sequence alignment, can be thought of as finding the shortest path between an initial state and a goal state in a large graph. Various methods for finding optimal solutions are known in the art, and various ad-hoc methods have been proposed to quickly find sub-optimal solutions, represented as shortest-path problems. If sufficient computation is available, optimal solutions to such problems can be found using A* search with an admissible heuristic (Peter E. Hart, Nils J. Nilsson, and Bertram Raphael, "A Formal Basis for the Heuristic Determination of Minimum Cost Paths", *IEEE Transactions of Systems Science and Cybernetics,* SSC-4 (2):100-107, July 1968). However, in many practical scenarios, time is limited or costly and it is not desirable, or even feasible, to look for the least-cost path. Instead, search effort must be carefully allocated in a way that balances the cost of the paths found with the cost of the computation and the amount of time available.

By way of example, A* is a best-first search in which the 'open list' of unexplored nodes is sorted by $f(n)=g(n)+h(n)$, where $g(n)$ denotes the known cost of reaching a node n from the initial state and $h(n)$ is typically a lower bound on the cost of reaching a solution from n. A* is optimal in the sense that no algorithm that returns an optimal solution using the same lower bound function $h(n)$ visits fewer nodes (Rina Dechter and Judea Pearl, "The Optimality of A*", in Laveen Kanal and Vipin Kumarto, editors, *Search in Artificial Intelligence,* pages 166-199, Springer-Verlag, 1988). However, in many applications solutions are needed faster than A* can provide them. To find a solution faster, it is common practice to increase the weight of $h(n)$ via $f(n)=g(n)+w \cdot h(n)$, with $w \geq 1$. There are many variants of weighted A* search, including Anytime A* and ARA*. In ARA*, for example, a series of solutions of decreasing cost is returned over time. The weight w is initially set to a high value and then decremented by $\delta$ after each solution. If allowed to continue, w eventually reaches 1 and the cheapest path is discovered. Of course, finding the optimal solution this way takes longer than simply running A* directly.

These algorithms suffer from two inherent difficulties. First, it is not well understood how to set parameters to best satisfy the user's needs. Setting $\omega$ too high or $\delta$ too low can result in many poor-quality solutions being returned, wasting time. But if $\omega$ is set too low or $\delta$ too high, the algorithm may take a very long time to find a solution. Therefore, to use a weighted A* technique like ARA* the user must perform many pilot experiments in each new problem domain to find good parameter settings.

Second, for anytime algorithms such as ARA*, the user must estimate the right time to stop the algorithm. The search process appears as a black box that could emit a significantly better solution at any moment, so the user must repeatedly estimate the probability that continuing the computation will be worthwhile. This requires substantial prior statistical knowledge of the run-time performance profile of the algorithm and rests on the assumption that such learned knowledge applies to the current instance.

These difficulties suffer from a more general problem: anytime algorithms must provide suboptimal performance due to their ignorance of the user's utility function. It is simply not possible in general for an algorithm to quickly transform the best solution achievable starting from nothing within time t into the best solution achievable in time t+1. Without the ability to decide during the search whether a distant solution is worth the effort of reaching it, anytime algorithms must either waste time finding nearby poor-quality solutions or overexert themselves finding the very best solution when any would have sufficed.

It would be desirable to eliminate the problems of ad hoc parameter modification and laborious performance profiling by applying an estimate of the distance in search steps to the nearest solution below a search node and combining this with the user's utility function to evaluate candidate search nodes.

BRIEF SUMMARY

The disclosed embodiments provide examples of improved solutions to the problems noted in the above Background discussion and the art cited therein. There is shown in these examples an improved method for obtaining solutions to combinatorial problems by way of a discrete state-based search approach utilizes a node evaluation function based both on solution quality and distance in search steps to a goal. The method considers the problem as finding the shortest path between an initial state and a goal state in a large graph and performs solution evaluation utilizing computation time balanced against solution quality. Rather than solely using a lower bound on the solution cost achievable below a search node, an estimate of the distance (in search steps) to the nearest solution below a search node is also utilized. These are combined using the user's stated utility function (represented as a linear function of time and cost) to evaluate candidate search nodes.

In another embodiment, there is disclosed a system for obtaining solutions to combinatorial problems by way of a discrete state-based search approach utilizing a node evaluation function based both on solution quality and distance in search steps to a goal. The system is in the form of an application stored and executed on a computer. The system includes executable modules, such as program modules, being executed by any of various computer system configurations, including a networked computer, hand-held devices, multi-processor systems, microprocessor-based or programmable consumer electronics, networked PCs, minicomputers, mainframe computers, and the like.

A computer-readable storage medium having computer readable program code embodied in the medium such that, when the program code is executed by a computer, causes the computer to perform method steps for obtaining solutions to combinatorial problems by way of a discrete state-based search approach utilizing a node evaluation function based both on solution quality and distance in search steps to a goal. The method considers the problem as finding the shortest path between an initial state and a goal state in a large graph and performs solution evaluation utilizing computation time balanced against solution quality. Rather than solely using a lower bound on the solution cost achievable below a search node, an estimate of the distance (in search steps) to the nearest solution below a search node is also utilized. These are combined using the user's stated utility function (represented as a linear function of time and cost) to evaluate candidate search nodes.

A method for obtaining solutions to combinatorial problems by way of a discrete state-based search approach utilizes a node evaluation function based both on solution quality and distance in search steps to a goal, with the method stored and executed as an application for use by network devices. The method and system may be practiced in distributed computing environments where tasks are performed by remote processing devices that are linked through a communications network or in a centralized computing environment. In a distributed computing environment, method program modules may be located in both local and remote memory storage devices.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

Disclosed herein are a method and system that identifies solutions for such problems as planning, parsing, and sequence alignment. The method and system employ a combinatorial search, or a "state-space" search, which solves a problem by maintaining a list of partial solutions, each of which is called a node. Each node contains information about the current state of problem solving in that partial solution. How this list of nodes/states is maintained and how it is decided which one to work on next defines the operation of each particular algorithm. A node is worked on or "expanded" by generating all possible "child" nodes representing the different ways of continuing to fill in the partial solution.

The method considers the problem as finding the shortest path between an initial state and a goal state in a large graph and performs solution evaluation utilizing computation time balanced against solution quality. In this approach, rather than solely using a lower bound on the solution cost achievable below a search node, an estimate of the distance (in search steps) to the nearest solution below a search node is also utilized. These are combined using the user's stated utility function (represented as a linear function of time and cost) to evaluate candidate search nodes. In contrast to existing approaches to problem solution, the system and method described herein do not suffer from the need to run many preliminary trials to determine settings for parameters or the need to separately determine the time to stop the algorithm. Instead, they utilize knowledge of the user's utility function to guide the search in a way that respects the user's desires. This enables the system and method to successfully adapt their behavior to suit the user and provide enhanced performance.

The system and method apply to software used for such applications as route planning for vehicles and robots, planning the fastest sequence of actions to achieve a goal (in manufacturing process control, factory operations, or logistics management), natural language parsing (finding a probable interpretation for a sentence), or sequence alignment (DNA or protein analysis), etc. In the following description numerous specific details are set forth in order to provide a thorough understanding of the system and method. It would be apparent, however, to one skilled in the art to practice the system and method without such specific details. In other instances, specific implementation details have not been shown in detail in order not to unnecessarily obscure the present invention.

Various computing environments may incorporate the time-aware pathfinding method and system. The following discussion is intended to provide a brief, general description of suitable computing environments in which the time-aware pathfinding method and system may be implemented. Although not required, the method and system will be described in the general context of computer-executable instructions, such as program modules, being executed by a networked computer. Generally, program modules include routines, programs, objects, components, data structures, etc. that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like. The method and system may also be practiced in distributed computing environments where tasks are performed by remote processing devices that are linked through a communications network or in a centralized computing environment. In a distributed computing environment, program modules may be located in both local and remote memory storage devices.

Although the method and system described herein is not limited to embedded applications, the following discussion will pertain to embedded systems for purposes of example only. One skilled in the art will appreciate that the time-aware pathfinding method and system are useful in many complex problem domains, such as planning, parsing, and sequence alignment and wherever formulation as a shortest-path problem is of practical interest. Additionally, it may be practiced in a multitude of computing environments.

In many practical applications, there is not enough time to find the optimal solution. A search agent must estimate which node to expand next. Ideally, a search agent would evaluate the utility to be gained by each possible node expansion. This would be equal to the utility of the eventual outcomes enabled by that expansion, or the solutions lying below that node. For example, if there is only one solution in a tree-structured search space, expanding any node other than the one it lies beneath has no utility (or negative utility if time is costly). The method and system herein approximates these true utilities by assuming that the utility of an expansion is merely the utility of the highest-utility solution lying below that node.

Figure 2:
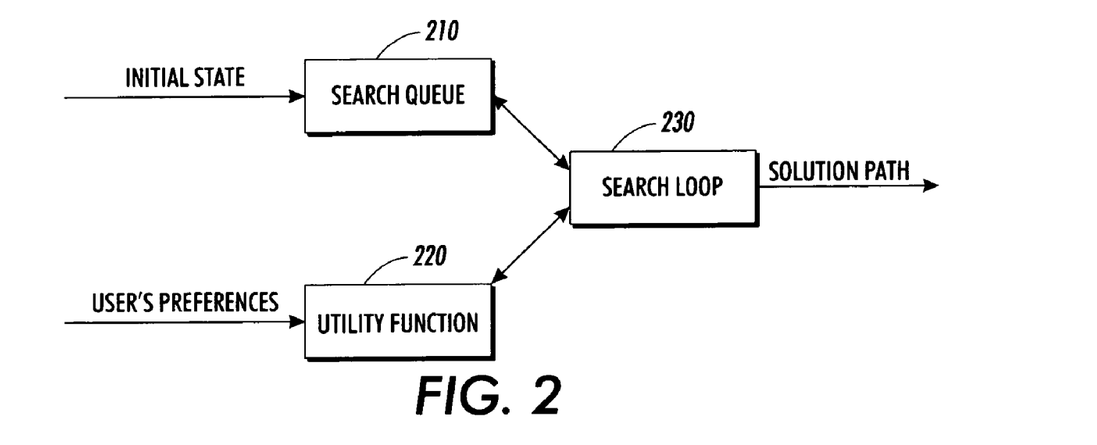
FIG. 2 illustrates an example architecture for time aware path finding.

This architecture is illustrated in FIG. 2, in which the initial problem-solving state, typically representing an empty path of length zero, is provided to form the first search node. This node is used to initialize the search queue 210 which is used to hold the nodes that are available to be explored next. The user's preferences, in the form of a utility function 220, are also provided. This utility function is used by a search loop 230 to decide which node from the search queue 210 to expand next. Eventually the search results in the identification of a solution path.

It is assumed that the user's utility function can be captured in a simple linear form. If f(s) represents the cost of solution s, and t(s) represents the time at which it is returned to the user, then the user is expected to supply three constants: $U_{default}$, representing the utility of immediately returning an empty solution, $w_f$, representing the importance of solution quality, and $w_t$, representing the importance of computation time. The utility of expanding node n is then computed as $$U(n) = U_{default} - \max_s \; w_f \cdot f(s) + w_t \cdot t(s)$$

where s ranges over the possible solutions available under n. This formulation permits exclusive attention to either cost or time, or any linear tradeoff between them. The number of time units that the user is willing to spend to achieve an improvement of one cost unit is $w_f/w_t$.

While the solutions s available under a node are unknown, it is possible to estimate some of their utilities by using functions analogous to the traditional heuristic function h(n). Instead of merely computing a lower bound on the cost of the cheapest solution under a node, it is also possible to compute the lower bound on distance in search nodes to that cheapest solution. In many domains, this additional estimate entails only trivial modifications to the usual h(n) function. Distance is then multiplied by an estimate of time per expansion to arrive at a time function t(s). To provide a more informed estimate, it is also possible to compute bounds on the cost and time to the nearest solution. The utility function U(n) can then be estimated as the maximum of the two utilities. For convenience, it is also possible to record cost f(n) and time t(n) for the node n as the values inherited from whichever hypothesized solution had the higher utility, the nearest or the cheapest.

Figure 1:
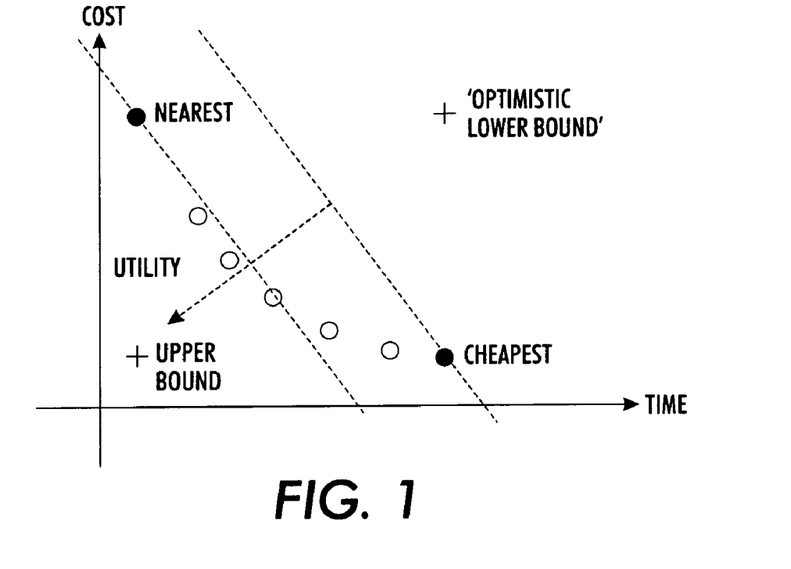
FIG. 1 illustrates estimating utility using the maximum of bounds on the nearest and cheapest solutions.

These concepts are illustrated graphically in FIG. 1. The two solid dots represent the solutions hypothesized by the cheapest and nearest heuristic functions. The dashed circles represent hypothetical solutions representing a trade-off between those two extremes. The dotted lines represent contours of constant utility and the dotted arrow shows the direction of the utility gradient. Assuming that the two solid dots represent lower bounds, then an upper bound on utility would combine the cost of the cheapest solution with the time to the nearest solution. However, this may be a significant overestimate. Taking the time of the cheapest and the cost of the nearest is not a true lower bound on utility because the two hypothesized solutions are themselves lower bounds and might in reality lie further toward the top and right of the figure. Note that under different utility functions (different slopes for the dotted lines) the relative superiority of the nearest and cheapest solutions can change.

Figure 3:
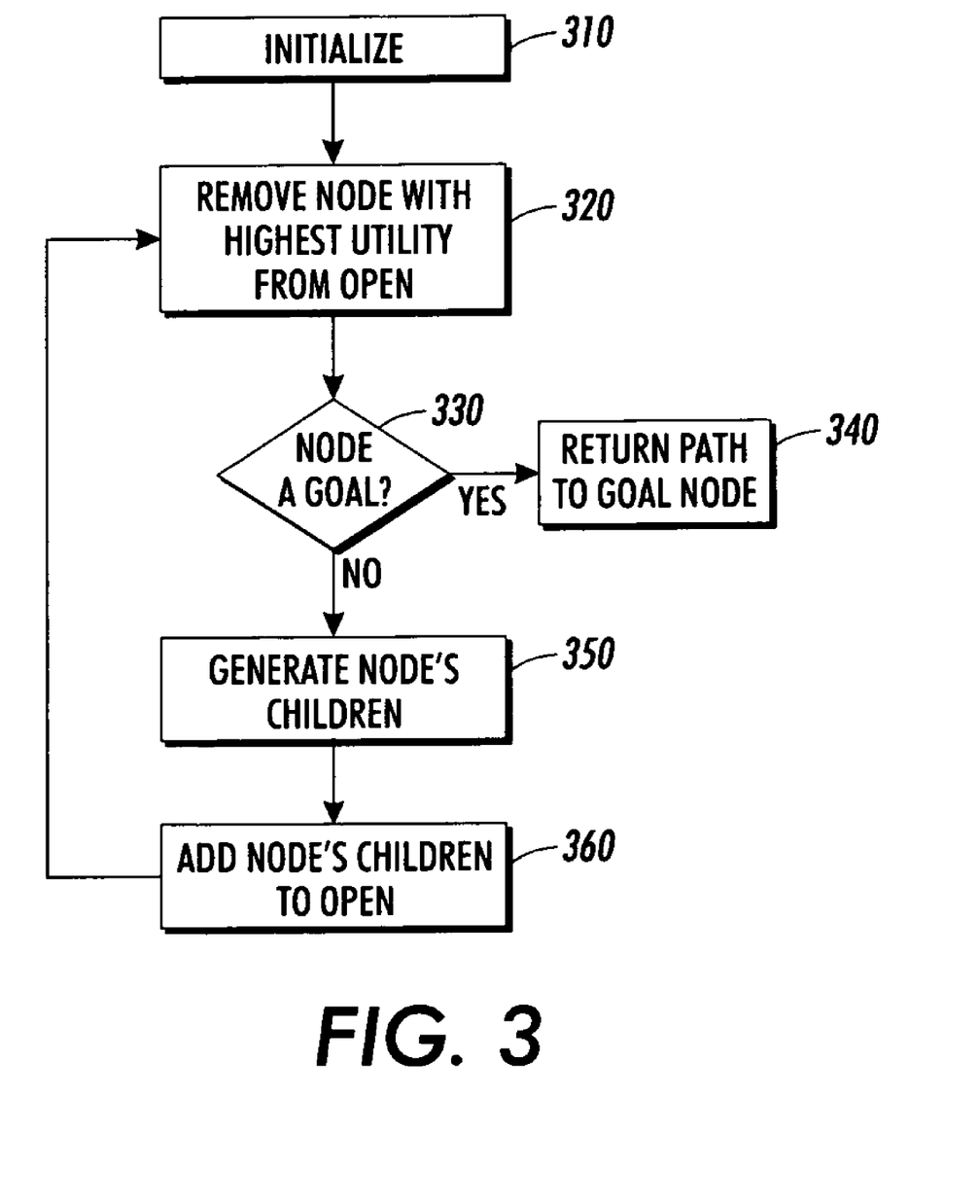
FIG. 3 is a flowchart illustrating an example embodiment of the method for time-aware path finding.

Turning now to FIG. 3, there is illustrated one embodiment of the method for time-aware pathfinding in which a single queue, traditionally called "open", of the nodes that have been generated but not yet expanded is maintained. At 310 the system is initialized with the initial problem-solving state and the user's utility function. As described above, the initial state is used to form the initial search node, which is used to initialize the queue open. This queue is often implemented using a priority queue data structure. The ordering function used in open prefers high U(n) [utility] values, breaking ties for low t(n) [time], breaking ties for low f(n) [cost], and breaking ties for high g(n) [known cost for reaching a node n]. It is noted that the linear formulation of utility means that open need not be resorted as time passes because all nodes lose utility at the same constant rate independent of their estimated solution cost. Utilities are thus stored independent of the search time expended so far.

It will be clear to those skilled in the art that other formulations of the utility function, such as piecewise linear functions of time, have similar properties and could thus be utilized here instead. At 320 the node with highest utility value U(n) is removed from open. At 330 a determination is made as to whether the node with the highest utility is a goal. If it is a goal, the path is returned to the goal node at 340. If the node with the highest utility is not a goal, the node's children are generated at 350. The exact method of generating the children will vary depending on the problem being solved. The g(n) values for the children can often be easily computed at this time by adding a suitable value to the g(n) of the parent node, depending on the individual paths represented by each child. As in other shortest-path algorithms, it is assumed that no negative cost cycles exist in the search space. The node's children are added to open at 360, and another node with highest utility is selected at 320. This sequence is repeated until a goal node is identified.

The method for time-aware pathfinding proceeds directly to the highest-utility solution if the utility estimates are correct. When the method expands the start node, the child node on the path to the highest utility solution will clearly be put at the front of the open list. The method expands this node next. One of the children of this node must have the highest utility on the open list, since it is one step closer to the goal than its parent, which previously had the highest utility, and it leads to a solution of the same quality. In this way, the method proceeds directly to the highest utility solution achievable from the start state. No loss in utility is incurred due to wasted time, since it expands only nodes on the path to the optimal solution. The utility U(n) is an estimate, not a lower bound, so it can change arbitrarily along a path. This implies that it is possible to discover a better route to a previously expanded state.

Figure 4:
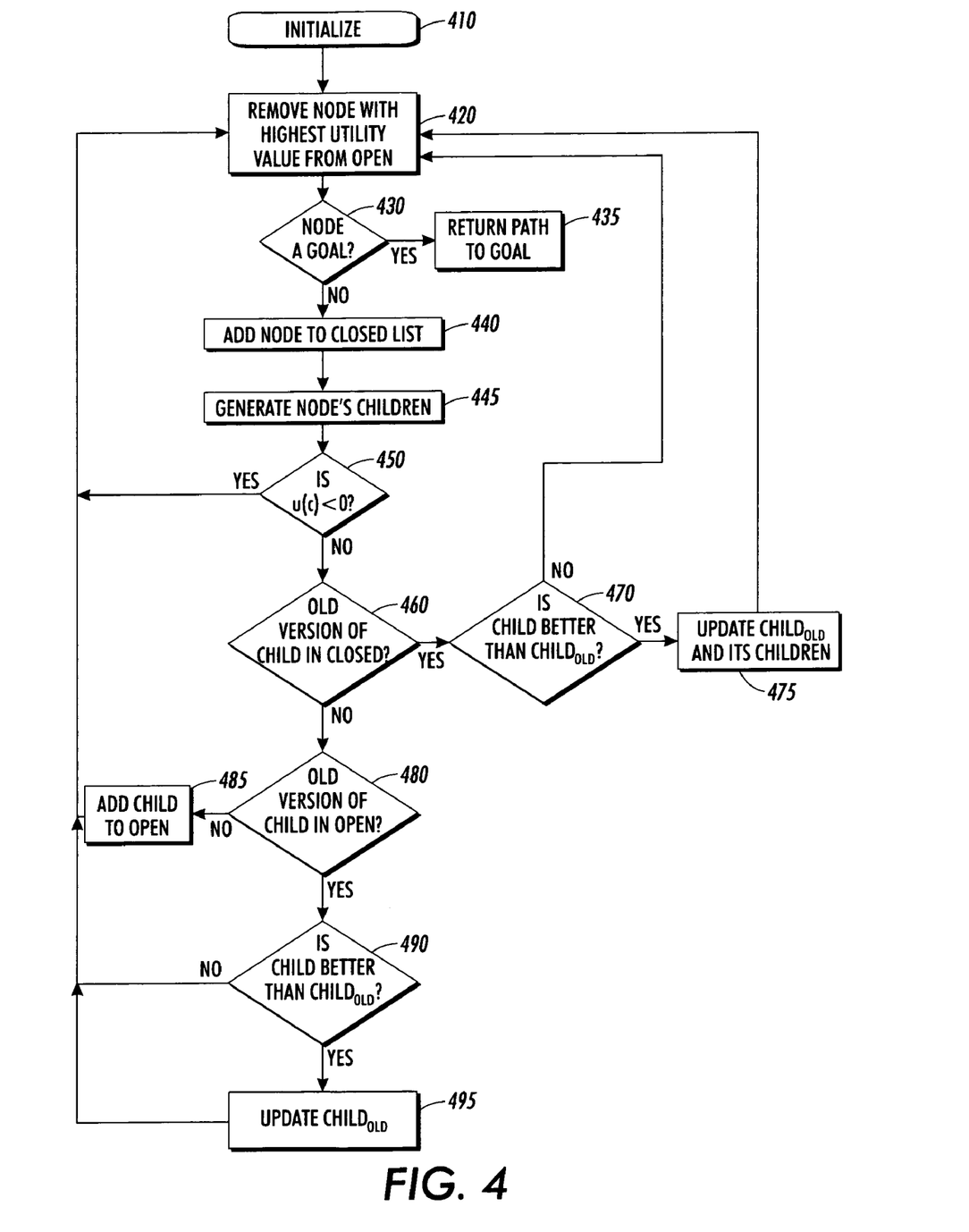
FIG. 4 is a flowchart illustrating another example embodiment of the method for time-aware path finding.

FIG. 4 illustrates another embodiment of the time-aware pathfinding method in which a list closed of nodes whose children have been generated is maintained. This allows the search to avoid unnecessarily expanding a node that has been reached twice by different paths. The closed list is often implemented using a hash table data structure. It can happen that later paths to a node are in fact superior to the first one. In this embodiment, pointers are maintained from every expanded node to its children, to allow updating of the children's g(n) costs. The method initializes at 410 as in the previous embodiment. At 420 the node with highest utility is removed from open after applying the algorithm described with reference to 320 in FIG. 3. A determination is made as to whether the node is a goal at 430. If the node is a goal the path is returned as a goal at 435. If the node is not a goal, the node is added to the closed list at 440 and the nodes's children are generated at 445. A determination is made at 450 as to whether the utility for each of the node's children is less than zero. If the calculated utility for each child's node is less than zero, the method returns to 420 and another node is selected. If the utility of the child node is not less than zero, it is determined whether an old version of the child (child$_{old}$) is in the closed list at 460, to identify duplicate paths to the same search state. Duplicate paths to the same search state are detected and only the path with the lower solution cost is retained. Links to a node's children as well as the preferred parent are recorded so that the utility of descendants can be recomputed if the known cost g(n) of reaching a node n changes. Accordingly, if an old version of the child is in the closed queue, an evaluation is performed at 470 to determine if the child node is better than child$_{old}$. If the child node utility is better than the child$_{old}$ utility, child$_{old}$ and its children, and their children recursively, are updated at 475 and the method returns to 420 to repeat the node evaluation sequence. If the child node utility is not better than the child$_{old}$ utility, then the method returns to 420 to repeat the evaluation sequence.

If an old version of the child (child$_{old}$) is not in the closed queue, a determination is made at 480 as to whether an old version of the child node is in open. If an old version of the child node is not in open, the child node is added to open at 485 and the method returns to 420 to repeat the evaluation sequence. If an old version of the child node is in open, the method determines whether the child node utility is better than the child$_{old}$ utility at 490. If the child node utility is better than the child$_{old}$ utility, then child$_{old}$ is updated at 495.

Figure 5:
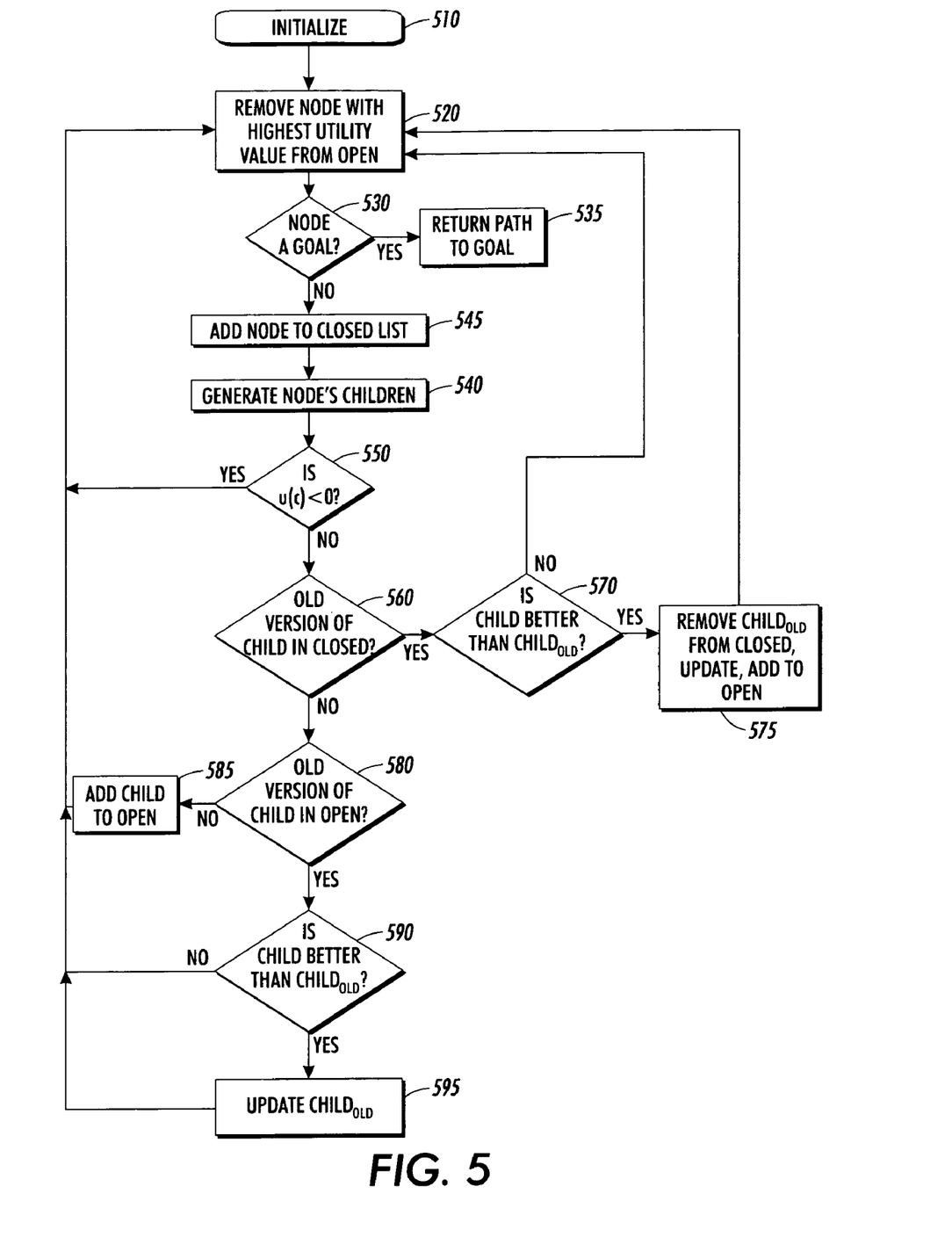
FIG. 5 is a flowchart illustrating a third example embodiment of the method for time-aware path finding.

Turning now to FIG. 5, there is illustrated an embodiment of the time-aware pathfinding method in which, instead of maintaining pointers from every node on closed to its children, nodes on closed to which a better path is discovered are merely placed back on the open list. Most steps are analogous to those in the previous embodiment, with the exception of 575 which is different from 475. At step 560 it is determined whether an old version of the child (child$_{old}$) is in the closed list, thus detecting duplicate paths to the same search state. If an old version of the child is in the closed queue, an evaluation is performed at 570 to determine if the child node is better than child$_{old}$. If the child node utility is better than the child$_{old}$ utility, child$_{old}$ is removed from the closed list at 575, the new child is placed on the open list and the method returns to 520 to repeat the node evaluation sequence. Note that no time is spent updating children of child$_{old}$ because the children of the new copy of the child will be expanded first (due to their lower g(n) values). Although this variation is easier to implement, its disadvantage is that the children of child$_{old}$ remain on open (using space) and might also eventually be expanded (wasting time). If the child node utility is not better than the child$_{old}$ utility, then the method returns to 520 to repeat the evaluation sequence.

Figure 6:
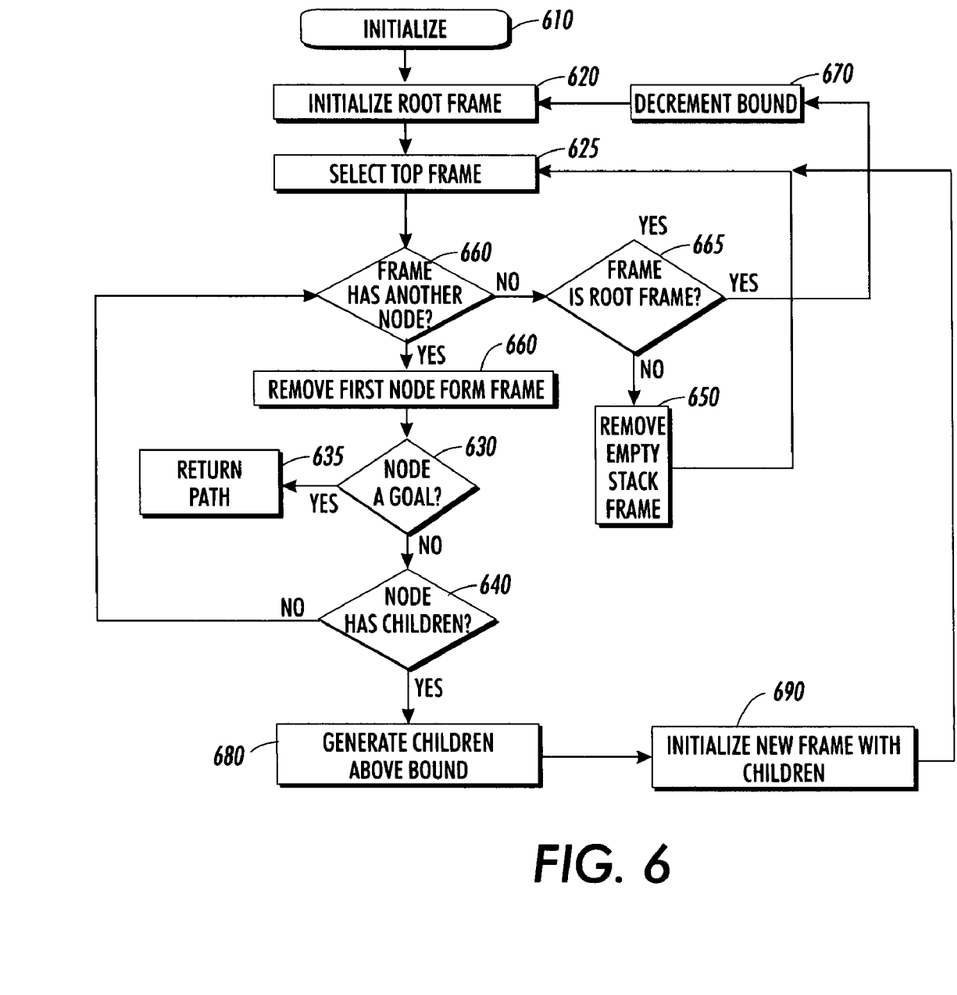
FIG. 6 is a flowchart illustrating a fourth example embodiment of the method for time-aware path finding.

FIG. 6 illustrates yet another embodiment of the method for time-aware pathfinding, in which an iterative deepening technique is employed to reduce memory usage. Rather than maintaining an open queue and expanding nodes in strictly best-first order, a depth-first traversal of the search space is done to save memory space. A utility bound is used to restrict the depth-first search to visit only nodes with high utility. If the depth-first search completes without finding a goal, the utility bound is decreased and the depth-first search is restarted. In order to depict the recursive depth-first search in a flow-chart format, FIG. 6 explicitly mentions the stack frames representing the state of the search at each level in the search tree. A stack data structure is maintained to hold these frames. Each frame holds an ordered list of the nodes that have yet to be explored at that level.

At 610 the method is initialized with the initial state and the user's utility function as in the previously described embodiments. The utility bound can be set to a high value, such as the utility of the initial state. At 620, the first frame is initialized with the initial search node and placed on the top of the stack. This first stack frame is called the root frame because it represents the root for the depth-first search tree. At 625, the frame at the top of the stack is examined. At 660 it is determined whether the list of nodes in the frame is empty. If the frame has nodes, then at 655 the search node at the front of its list is removed. A determination is made at 630 as to whether the node is a goal. If the node is a goal the path is returned as a goal at 635. If the node is not a goal, a determination is made at 640 as to whether the node has children. If the node has children, the child nodes above the current utility bound are generated at 680. At 690 the new child nodes are used to initialize a new stack frame which is pushed on top of the stack, representing a recursive call to depth-first search on these children. The method then returns to 625 to examine this new frame. If the node does not have children, the method returns to 660 to determine if the frame has another node. If another node is not present, a determination is made as to whether the frame is the root frame at 665. If it is the root frame, the bound is decremented at 670 and the method returns to 620 to re-initialize the root frame.

It will be apparent to those skilled in the art that the bound can be decremented in several ways. One way is to use the highest utility of any node that was generated but not expanded during the previous iteration of depth-first search. Another would be to use statistical estimation to determine a bound that would allow approximately twice as many nodes to be generated as on the previous iteration. If the frame is not the root frame, the method removes the empty stack frame from the stack ('pops' the stack) at 650 and returns to 625 where the frame at the top of the stack is examined and the node at the front of its list is removed. Alternatively, another approach to reducing memory usage with the time-aware pathfinding method is use of divide-and-conquer reconstruction (Richard Korf, Divide-and-conquer bidirectional search: First results, Proceedings of the Sixteenth International Joint Conference on Artificial Intelligence (IJCAI-99), Stockholm, Sweden, August 1999, pp. 1184-1189).

While the present discussion has been illustrated and described with reference to specific embodiments, further modification and improvements will occur to those skilled in the art. For example, a deadline could be imposed on the search time or on the sum of the search time and solution execution time. Nodes exceeding these bounds could be pruned. Various methods could be used to improve the estimation of the utility of a node. The h(n) and t(n) functions used do not have to be lower bounds. The time-aware pathfinding method requires estimates—there is no admissibility requirement. To correct a lower bound into an estimate when calculating utility, it is possible to compute a running average of the one-step error in the cost-to-go and distance-to-go by temporal difference learning. If the values for a node aren't sufficiently lowered from those for its parent, the error is recorded and used to estimate the amount by which the cost-to-go and distance-to-go typically underestimate. These correction factors are then used when computing a node's utility to give a more accurate estimate based on the experience during the search. Alternatively, examples of typical estimation errors can be gathered before the search begins and utilized, perhaps via the aid of statistical analysis, during operation of the utility calculation to provide improved estimates.

Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations, which do not depart from the spirit and scope of the embodiments described herein.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed:

1. A method for obtaining solutions to a combinatorial problem, said method comprising:
    maintaining a plurality of nodes, each of said nodes comprising a partial solution to said combinatorial problem;
    performing a discrete state-based search of said plurality of nodes utilizing a user-specified utility function based both on solution quality and distance in search steps to a goal, said method stored and executed as a computer application, and said goal being a node comprising a desired solution;
    initializing operation by creating an open queue to hold nodes that have been generated but not expanded;
    applying the utility function to identify one of said nodes having a highest utility value, wherein said utility function considers both solution quality and solution time;
    providing a utility default value, wherein said utility default value represents the utility of immediately returning an empty solution;
    providing a solution quality importance factor;
    providing a computation time importance factor;
    determining solution cost for a particular node by multiplying an estimated cost of a solution with said solution quality factor;
    determining solution time for a particular node by multiplying an estimated time at which a solution could be returned to the user with said computation time importance factor;
    summing said solution cost for a particular node and said solution time for a particular node to determine a sum;
    subtracting said sum from said utility default value; and
    repeating determining said solution cost for another node, determining said solution time for another node, summing said solution cost and said solution time for said another node to determine another sum, and subtracting said another sum from said utility default value until a node with highest utility is identified;
    removing said node with highest utility value from said open queue;
    determining whether said node with highest utility value is a goal, wherein said goal is a desired problem solution;
    generating a plurality of child nodes for said node with highest utility value if said node is not a goal, wherein each of said child nodes represents a different way of continuing to fill in the partial solution of the parent node, wherein said parent node comprises the node with highest utility value;
    adding said parent node's child nodes to said open queue;
    repeating the sequence of applying said utility function, removing a highest utility valued node, determining whether said highest utility valued node is a goal, generating child nodes, and adding said child nodes to said open queue until a problem solution is identified; and
    returning at least one of said desired solution and path to said goal to the user.

2. A method for obtaining solutions to a combinatorial problem, said method comprising:
    maintaining a plurality of nodes, each of said nodes comprising a partial solution to said combinatorial problem;
    performing a discrete state-based search of said plurality of nodes utilizing a user-specified utility function based both on solution quality and distance in search steps to a goal, said method stored and executed as a computer application, and said goal being a node comprising a desired solution;
    initializing operation by creating an open queue to hold nodes that have been generated but not expanded;
    applying the utility function to identify one of said nodes having a highest utility value, wherein said utility function considers both solution quality and solution time;
    removing said node with highest utility value from said open queue;
    determining whether said node with highest utility value is a goal, wherein said goal is a desired problem solution;
    generating a plurality of child nodes for said node with highest utility value if said node is not a goal, wherein each of said child nodes represents a different way of continuing to fill in the partial solution of the parent node, wherein said parent node comprises the node with highest utility value;
    adding said parent node's child nodes to said open queue;
    determining whether the utility value for each of said child nodes is less than zero;
    repeating the sequence of applying said utility function, removing a highest utility valued node, determining whether said highest utility valued node is a goal, generating child nodes, and adding said child nodes to said open queue until a problem solution is identified; and
    returning at least one of said desired solution and path to said goal to the user.

3. The method according to claim 2, further comprising determining for each current of said child nodes whether a previously determined child node corresponding to each current child node is included within said closed list if said utility for each of said child nodes is not less than zero.

4. The method according to claim 3, further comprising:
    evaluating whether said current child node utility is better than said previously determined child node if said previously determined child node is included within said closed list; and
    updating said previously determined child node and its children if said previously determined child node is better than said current child node.

5. The method according to claim 3, further comprising:
evaluating whether said current child node utility is better than said previously determined child node if said previously determined child node is included within said closed list;
if said current child node utility is better, removing said previously determined child node from said closed list;
updating said previously determined child node; and
adding said updated previously determined child node to said open queue.

6. The method according to claim 3, further comprising determining whether said previously determined child node is included in said open queue if said previously determined child node is not included in said closed list.

7. The method according to claim 6, further comprising adding said current child node to said open queue if said previously determined child node is not included in said open queue.

8. The method according to claim 6, further comprising determining whether said current child node utility is better than said previously determined child node if said previously determined child node is included in said open queue.

9. The method according to claim 8, further comprising updating said previously determined child node if said current child node utility is better than said previously determined child node.

10. A method for obtaining solutions to a combinatorial problem, said method comprising:
maintaining a plurality of nodes, each of said nodes comprising a partial solution to said combinatorial problem;
performing a discrete state-based search of said plurality of nodes utilizing a user-specified utility function based both on solution quality and distance in search steps to a goal, said method stored and executed as a computer application, and said goal being a node comprising a desired solution, wherein said plurality of nodes are maintained in the form of a search tree, and wherein a utility bound is used to restrict a depth-first search to visit only nodes with high utility, and wherein stack frames represent the state of the search at each level in the search tree, and wherein a stack data structure is maintained to hold the frames, said discrete state-based search comprising:
initializing a root frame with an initial search node, wherein said root frame represents the state of the search at a first level in the search tree;
placing said root frame on the top of the stack frames, wherein said root frame becomes the top frame;
identifying a search node from said top frame;
determining whether said search node is a goal, wherein said goal is the desired problem solution;
determining whether said search node has child nodes above said utility bound if said node is not a goal;
generating a plurality of child nodes above said utility bound for said node if said node has child nodes, wherein each of said child nodes represents a different way of continuing to fill in the partial solution of the parent node;
initializing a new stack frame with said child nodes, wherein said new stack frame is pushed on top of the stack, wherein said frame on top of the stack comprises a top frame;
determining whether said top frame has another node if said search node does not have children;
determining whether said top frame is a root frame, if said top frame does not have another node;
decrementing said utility bound if said top frame is the root frame;
repeating said method steps from the step of identifying a search node from another top frame and determining whether said another search node is a goal until a goal is reached if said top frame has another node or said stack frames have been restructured or said new stack frame with said child nodes has been initialized; and
repeating said method steps from the step of initializing a new root frame, and determining whether said new search node is a goal until a goal is reached when said utility bound is decremented; and
returning at least one of said desired solution and a path to said goal to the user.

11. The method according to claim 10, wherein decrementing said utility bound comprises using a highest utility value of any node that was generated but not expanded.

12. The method according to claim 10, wherein decrementing said utility bound comprises using a statistical estimation to determine a decrement value by which to decrement said bound such that additional child nodes are generated when repeating the step of generating a plurality of child nodes based on a constant factor times a number of generated child nodes currently generated.

13. A method for obtaining solutions to a combinatorial problem, said method comprising:
maintaining a plurality of nodes, each of said nodes comprising a partial solution to said combinatorial problem;
performing a discrete stat-based search of said plurality of nodes utilizing a user-specified utility function based both on solution quality and distance in search steps to a goal, said method stored and executed as a computer application, and said goal being a node comprising a desired solution;
initializing operation by creating an open queue to hold nodes that have been generated but not expanded;
applying the utility function to identify one of said nodes having a highest utility value, wherein said utility function considers both solution quality and solution time;
removing said node with highest utility value from said open queue;
determining whether said node with highest utility value is a goal, wherein said goal is a desire problem solution;
generating a plurality of child nodes for said node with highest utility value if said node is not a goal, wherein each of said child nodes represents a different way of continuing to fill in the partial solution of the parent node, wherein said parent node comprises the node with highest utility value;
adding said parent node's child nodes to said open queue;
repeating the sequence of applying said utility function, removing a highest utility valued node, determining whether said highest utility valued node is a goal, generating child nodes, and adding said child nodes to said open queue until a problem solution is identified;
imposing a deadline on the search time or on the sum of the search time and solution execution time; and
returning at least one of said desired solution and a path to said goal to the user.

14. A method for obtaining solutions to a combinatorial problem, said method comprising:
maintaining a plurality of nodes, each of said nodes comprising a partial solution to said combinatorial problem;

performing a discrete state-based search of said plurality of nodes utilizing a user-specified utility function based both on solution quality and distance in search steps to a goal, said method stored and executed as a computer application, and said goal being a node comprising a desired solution, wherein said utility function utilizes estimates for cost and time when calculating utility;

initializing operation by creating an open queue to hold nodes that have been generated but not expanded;

applying the utility function to identify one of said nodes having a highest utility value, wherein said utility function considers both solution quality and solution time;

removing said node with highest utility value from said open queue;

determining whether said node with highest utility value is a goal, wherein said goal is a desired problem solution;

generating a plurality of child nodes for said node with highest utility value if said node is not a goal, wherein each of said child nodes represents a different way of continuing to fill in the partial solution of the parent node, wherein said parent node comprises the node with highest utility value;

adding said parent node's child nodes to said open queue;

repeating the sequence of applying said utility function, removing a highest utility valued node, determining whether said highest utility valued node is a goal, generating child nodes, and adding said child nodes to said open queue until a problem solution is identified; and returning at least one of said desired solution and a path to said goal to the user.

15. The method according to claim 14, wherein temporal difference learning is applied to calculate said estimates for cost and time.

* * * * *